UNITED STATES PATENT OFFICE.

CYRUS E. BRADLEY, OF DETROIT, MICHIGAN.

PROCESS OF EMBOSSING MIRRORS.

SPECIFICATION forming part of Letters Patent No. 243,200, dated June 21, 1881.

Application filed April 8, 1881. (No specimens.)

*To all whom it may concern:*

Be it known that I, CYRUS E. BRADLEY, of Detroit, in the county of Wayne and State of Michigan, have invented an Improvement in Process of Embossing Mirrors, of which the following is a specification.

The nature of my invention relates to certain new and useful improvements in the manufacture of embossed mirrors.

The invention consists in the peculiar process employed, as more fully hereinafter described.

Take two (2) parts of white resin and one (1) part of gum-dammar and grind them in water, clean the glass to be operated upon from all grease and dust, then coat one side of the glass with the preparation of resin and gum-dammar, using a fine or camel's-hair brush to lay the preparation on with, and let it dry on the glass. Then take the previously-prepared stencil-pattern (which may be cut out of heavy pattern-paper) and lay it on this prepared side of the glass, and with a bristle brush clean the parts of the glass exposed through the pattern and remove the pattern, then with a pointed stick or other suitable implement remove the ties that have been left by the pattern. Then lay the glass on a heater or in an oven and allow it to remain long enough to melt the preparation on the glass, but not sufficiently long to let such preparation run. Then remove the glass from the heater and let it cool, after which coat the opposite side of the glass with asphaltum or asphaltum mixed with beeswax, when the glass is ready for the acid. Take two parts of water and one part of fluoric acid in a pan or bath, adding one-quarter of a pound of fluor-spar to one-half gallon of the acid. This latter (fluor-spar) is designed to produce a dull silver cast in the embossed parts. Place the glass in the acid with the figure side up and stir the acid well with a stiff brush, allow the glass to remain long enough in the bath to etch the figured parts in the glass, then remove the glass and rinse off well with clean water, after which clean off the preparation of resin and gum-dammar with turpentine or other suitable material, then clean well with pulverized chalk and repolish with jewelers' rouge, when the glass will be ready for the silvering process. To this end two solutions are employed: first, dissolve nearly equal parts of Rochelle salts and caustic soda in distilled water; and, second, dissolve crystallized nitrate of silver in distilled water and treat it with ammonia until the precipitated oxide is nearly redissolved. This latter solution is again diluted with distilled water. Then with a clean cloth, wet with the second solution, rub over the parts of the glass to be silvered, after which wipe the glass with a dry clean cloth until thoroughly dry and free from dust and lint. Then mix the two solutions together, place the glass on the heater, figure side up, as before, and allow it to become hot, and then, the glass being level, pour the combined solutions on the glass and allow it to remain on the heater from a half to three-quarters of an hour, after which remove the glass, pour off any remaining unevaporated solution, rinse off with clean warm water, and allow the glass to dry. Then lay on the silvered side a coat of paint made of dry red lead mixed or ground with raw linseed-oil thinned with turpentine.

When it is desired to show lettering or ornamentation in gilt, trace around such parts with paint or asphaltum, and when the paint is dry clean off the silvering within such tracing with a pointed stick or other suitable tool and pulverized pumice-stone and water. When the parts to be gilded are well cleaned, apply thereto with a soft brush a sizing made of isinglass dissolved in water, after which lay gold-leaf and allow to dry, then apply another coat of the sizing and another layer of gold-leaf, as before. When dry, apply a coat of the paint as on the silvered portions.

What I claim as my invention is—

1. The process herein described of embossing glass for silvering, consisting in coating the surface to be etched with a preparation of resin and gum-dammar, removing portions of said coating with the aid of a stencil-pattern and submitting the glass to a bath of fluoric acid and fluor-spar, cleaning off the preparatory coating, and then polishing the etched surface with chalk and rouge, substantially as set forth.

2. The process of silvering glass embossed as herein described, consisting in first submitting the surface to be silvered to a solution of Rochelle salts and caustic soda and then to a solution of nitrate of silver, after which the surface is dried and heated and finally submitted while hot to a mixture of both solutions, substantially as described.

3. The process of gilding lettering or ornamentation upon the silvered side of an embossed or etched glass, substantially as herein specified.

4. As a means of protecting those parts of glass upon which no action is desired from the corrosive action of fluoric acid, a solution of white resin and gum-dammar, ground or mixed with water, substantially as set forth.

CYRUS E. BRADLEY.

Witnesses:
H. S. SPRAGUE,
E. SCULLY.